(12) United States Patent
Olvera et al.

(10) Patent No.: US 8,690,121 B2
(45) Date of Patent: Apr. 8, 2014

(54) DIFFERENTIAL SCREW ASSEMBLY FOR VARYING TORQUE FOR VALVE

(75) Inventors: Alfred Olvera, Houston, TX (US);
Mahesha Udipi, Houston, TX (US);
Raymond Krolczyk, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 353 days.

(21) Appl. No.: 13/075,348

(22) Filed: Mar. 30, 2011

(65) Prior Publication Data
US 2012/0248360 A1     Oct. 4, 2012

(51) Int. Cl.
*F16K 31/44*     (2006.01)

(52) U.S. Cl.
USPC ............. 251/265; 251/77; 251/273; 251/296; 251/326

(58) Field of Classification Search
USPC .......... 251/77, 251, 252, 264–268, 273, 274, 251/296, 326
See application file for complete search history.

(56) References Cited

U.S. PATENT DOCUMENTS

| | | | |
|---|---|---|---|
| 2,784,934 A * | 3/1957 | Paulius, Jr. et al. | 251/265 |
| 3,396,938 A * | 8/1968 | Matsui | 251/229 |
| 3,409,271 A | 11/1968 | Kallenbach | |
| 4,293,117 A * | 10/1981 | Mueller | 251/229 |
| 4,483,512 A | 11/1984 | Drapeau | |
| 4,688,601 A | 8/1987 | Astill | |
| 5,318,064 A | 6/1994 | Reinicke | |
| 5,419,530 A * | 5/1995 | Kumar | 251/95 |
| 5,829,734 A | 11/1998 | Freudendahl | |
| 6,182,678 B1 | 2/2001 | Ma | |
| 6,487,960 B1 | 12/2002 | Chatufale | |
| 6,609,533 B2 | 8/2003 | Sundararajan | |
| 6,684,897 B2 | 2/2004 | Sundararajan | |
| 6,702,025 B2 | 3/2004 | Meaders | |
| 6,783,107 B2 | 8/2004 | Chatufale | |
| 6,814,104 B2 | 11/2004 | Dean | |
| 7,578,349 B2 | 8/2009 | Sundararajan | |
| 7,762,274 B2 | 7/2010 | Wong | |

OTHER PUBLICATIONS

GB Search Report dated May 8, 2012 from corresponding Application No. GB1205540.6.
GB Search Report dated Jun. 6, 2012 from corresponding Application No. GB1205540.6.

\* cited by examiner

*Primary Examiner* — John K Fristoe, Jr.
*Assistant Examiner* — Matthew W Jellett
(74) *Attorney, Agent, or Firm* — Bracewell & Giuliani LLP

(57) ABSTRACT

An assembly for actuating a valve that is in a differential screw assembly when the valve is in a portion of its stroke that experiences high resistance. The actuating assembly is selectively changeable into a direct drive configuration when the valve is in a lower resistance portion of its stroke. A sliding sleeve moves axially within the actuating assembly and has a profile that is strategically dimensioned to change the actuating assembly configuration.

11 Claims, 4 Drawing Sheets

DIFFERENTIAL SCREW ASSEMBLY FOR VARYING TORQUE FOR VALVE

BACKGROUND OF THE INVENTION

1. Field of the Invention

This invention relates in general to a valve actuator. More specifically, this invention relates to a valve actuator having a varying applied torque.

2. Description of Related Art

A variety of equipment or tools used in oil field drilling and production have threaded members that rotate relative to each other while under a load. For example, gate valves are often used for oil and gas production control equipment. A gate valve has a body with a cavity. A flow passage intersects the cavity. A gate is moved between open and closed positions relative to the flow passages. The gate valve has to be able to move from a closed position to an open position while under the pressure of the flowline, which may be quite high. The gate is moved by a stem, which may be either a rising stem or non-rising stem. A rising stem moves axially as the nut rotates. With a non-rising type, the stem remains axially stationary while being rotated. The stem is threaded in both types and engages a threaded nut or a drive bushing. The flowline pressure forces the gate tightly against the seat. Frictional forces at this interface must be overcome in order to move the gate from the closed to the open position and vice versa.

SUMMARY OF THE INVENTION

Disclosed herein is an apparatus for actuating a valve, where resistance to actuating the valve is concentrated in a portion of the valve stroke. In an example embodiment, the valve actuator includes an annular actuator nut that is threaded on an outer surface. The nut includes threads on an inner surface that are oriented in the same direction to the threads on the outer surface. Moreover, the threads on the inner surface have a greater pitch than those on the outer surface. Also included is a latching sleeve that encircles a portion of the actuator nut and can move along an axis of the valve actuator. The apparatus also has a linkage attached to the actuator nut and that includes threads engaging threads on an outer surface of the latching sleeve. A profile is on an inner surface of the latching sleeve, where a portion defines an engaged portion and another portion defines a disengaged portion for the lever. A lever is included that is slidable within the profile. The apparatus has a collar threaded to the outer surface of the actuator nut that is rotatable with respect to the actuator nut when the lever is in the engaged portion of the profile and rotates with the actuator nut when the lever is in the disengaged portion of the profile. A valve stem is assembled by the threads on the inner surface of the actuator nut. In an alternative embodiment, the linkage has an annular elevator nut with threads on an inner surface engaging the threads on the outer surface of the latching sleeve. Optionally, a tubular housing telescopingly mounts over a portion of the elevator nut and end wall attached to the actuator nut. A key may be optionally attached to an inner surface of the housing, wherein in an example the key protrudes into an axial slot on an outer surface of the elevator nut, so that the elevator nut and housing are rotatingly coupled and axially slideable to one another. By rotating the actuator nut, the latching sleeve and the profile are axially moved across the lever. Alternatively, a ledge is provided that projects radially outward from an outer surface of the collar, pockets may be formed in the ledge for engaging the levers. An inner sleeve may be set in an annular space between the actuator nut and the latching sleeve. Yet further optionally is a lip radially projecting outward from an outer surface of the inner sleeve. A pivot pin can be included on the lip on which the lever is coupled. In an alternate embodiment, when the lever is in the engaged portion of the profile a torque input to the actuator nut generates a force on the valve stem at a force to torque ratio that is greater than a force to torque ratio when the lever is in the disengaged portion of the profile. In another alternate embodiment, when the lever is in the disengaged portion of the profile, each revolution of the actuator nut moves the valve stem an incremental distance at a revolution to displacement ratio that is greater than a revolution to displacement ratio when the lever is in the engaged portion of the profile. Optionally included is a transition portion in the profile between the engaged and disengaged portions, so that as the latching sleeve axially moves with respect to the collar, the collar selectively changes between engaged and disengaged configurations.

DETAILED DESCRIPTION OF THE INVENTION

Figure 1:
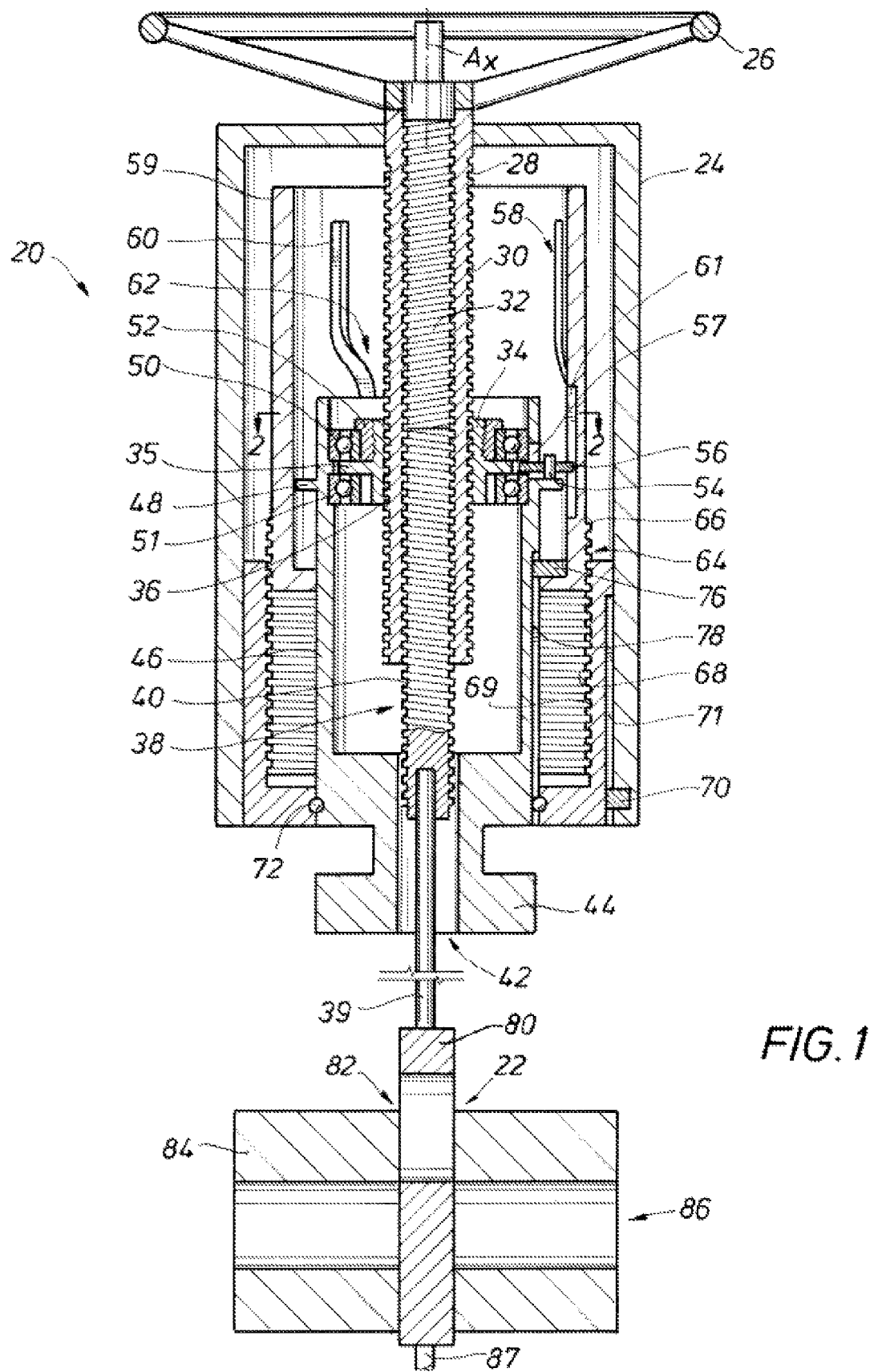
FIG. 1 is a side sectional view of an embodiment of valve actuator and valve in a closed position in accordance with the present disclosure.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

An embodiment of a valve actuator assembly 20 coupled to a valve 22 is shown in a side sectional view in FIG. 1. The valve actuator assembly 20 is made up of a cylindrical housing 24 that is closed on an upper end and open on a lower end. Shown disposed on the closed end of the housing 24 is a hand wheel 26 that includes a round outer handle and spokes that project radially inward from the handle. The spokes converge to an outer periphery of an actuator nut 28 shown generally coaxial with an axis $A_X$ of the valve actuator assembly 20. The actuator nut 28 is a tubular member having threads 30, 32 formed on its outer and inner surfaces. The threads 30 on the outer surface run in a direction opposite than the threads 32 on the inner surface. An annular collar 34 circumscribes a portion of the actuator nut 28 and includes a radial ledge 35 shown protruding outward from the outer surface of the collar 34. The inner circumference of the collar 34 has threads 36 that engage the threads 30 on the outer surface of the actuator nut 28.

Threadingly inserted within the actuator nut 28 is an elongated cylindrical upper stem 38, that in the embodiment of FIG. 1 is shown having an upper end disposed proximate the upper end of the collar 34. An opening on the lower end of the upper stem 38 is shown receiving an upper end of a valve stem 39, that as will be described in more detail below, couples with components of the valve 22. A lower end of the upper stem 38 and the valve stem 39 are shown circumscribed by a bore 42 that is coaxial with the axis $A_X$ and formed through a flange mount 44 on the lower end of the valve actuator assembly 20. The outer circumference of the flange mount 44 increases at its lower end to provide for mounting surface for the insertion of bolts (not shown) to assemble flange mount 44 on to the bonnet.

An annular inner sleeve 46 projects upward from the flange mount 44 and into the space between the actuator housing 24 and actuator nut 28. The upper end of the inner sleeve 46 terminates at a location just above the upper end of the collar 34. A radial lip 48 projects radially outward from the outer surface of the inner sleeve 46 at an elevation between the radial band 35 and lower end of the collar 34. Upper and lower bearing assemblies 50, 51 are shown in the annular space between the inner sleeve 46 and collar 34 and on the respective upper and lower surfaces of the radial band 35. The lower bearing assembly 51 is set within a recess formed on the inner surface of the inner sleeve 46. A locknut 52 which is shown threadingly engaged on an upper end of the collar 34, is provided with an outer radial flange on its upper end for retaining the bearing assemblies 50 between the locknut 52 and recess in the inner circumference of the inner sleeve 46. The presence of the bearing assemblies 50, 51 allows relative rotation between the collar 34 and inner sleeve 46.

Still referring to the embodiment of FIG. 1, a cylindrical pivot pin 54 projects axially from an upper surface 55 (FIG. 2) of the radial lip 48. Mounted on the pin 54, and oriented transverse to the axis $A_X$, is a lever 56 that is rotatable about the pivot pin 54 and as will be described in more detail below, selectively locks the collar 34 so it remains static with rotation of the actuator nut 28. An aperture 57 is provided through a side wall of the inner sleeve 46 through which the lever 56 extends and into selective contact with the radial band 35. The end of the lever 56 opposite where it contacts the radial band 35 is shown set within a slot 58 in the inner circumference of a latching sleeve 59. The latching sleeve 59 of FIG. 1 is an annular member that circumscribes an upper portion of the inner sleeve 46 and a portion of the actuator nut 28. The slot 58 includes a disengaged portion 60 that makes up the upper portion of the slot 58, and an engaged portion 61 that makes up the lower portion of the slot 58. A transition 62 is included within the slot 58 that connects the disengaged and engaged portions 60, 61. The transition 62 includes curved portions and is formed along a path oblique to the axis $A_X$. The disengaged and engaged portions 60, 61 each are substantially parallel with the axis $A_X$, but are offset from one another by an angle with respect to the axis $A_X$.

Also shown in FIG. 1 are threads 64 formed on a lower end and outer surface of the latching sleeve 59. The threads 64 extend along a portion up to a transition 66 wherein the outer radius of the latching sleeve 59 decreases at the transition 66. The threads 64 contact threads 68 formed on an inner circumference of an annular elevator nut 69. The elevator nut 69 is provided in the annular space between the housing 24 and latching sleeve 59. A key 70 is shown mounted into the inner surface of the housing 24 that projects radially inward into a slot 71 extending axially on the outer surface of the elevator nut 69. The key 70 and slot 71 couples the housing 24 and elevator nut 69 so rotation of one of the elevator nut 69 or housing 24 can correspondingly rotate the other member. Bearings 72 are provided to allow rotation of the elevator nut 69 with respect to the inner sleeve 46 and axially lock elevator nut 69 in one elevation. At the inner circumference of the latching sleeve 59 and proximate its lower end, a key 76 is mounted that projects radially inward to a slot 78 shown axially extending along the outer surface of the inner sleeve 46. The latching sleeve 59 is thus limited to axial movement with respect to the inner sleeve 46 as the key 76 and slot 78 prevent relative rotation between the latching sleeve 59 and inner sleeve 46.

Still referring to FIG. 1, the valve 22 includes a gate 80 with an opening 82 shown slidably disposed within a valve body 84. A passage 86 is in the body 84 and oriented transverse to the elongate side of the gate 80. As shown, the solid portion of the gate 80 is blocking the passage 86 thereby putting the valve 22 in a closed configuration. A balanced stem 87 is attached on a side of the gate 80 opposite to the valve stem 39. In an example embodiment, the balanced stem 87 is the same as that of the valve as stem 39. The balanced stem 81 can offset the force exerted by valve stem 39, and may bottom out at a valve body cavity or on an insert (not shown) attached to a lower portion of the valve body 84.

Figure 2:
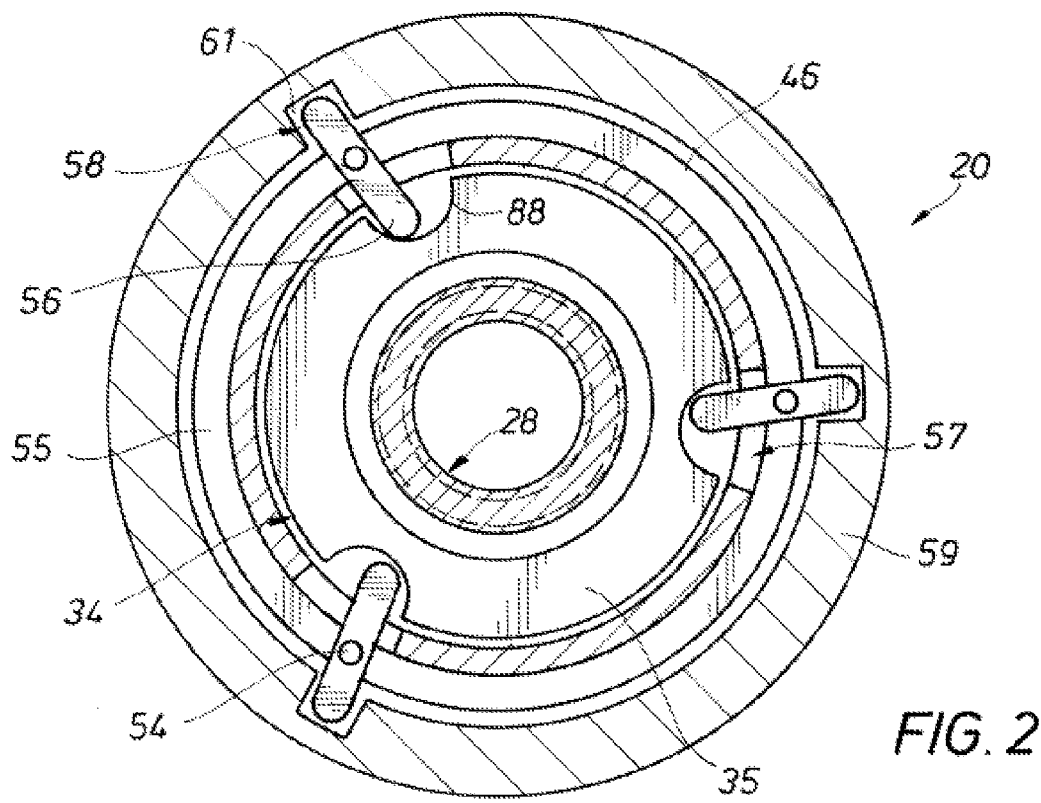
FIG. 2 is a sectional view of the valve actuator of FIG. 1 taken along lines 2-2.

Referring now to FIG. 2, shown is a sectional view of the valve actuator assembly 20 taken along lines 2-2 that illustrates engagement between the lever 56 and collar 34. Further provided in the embodiment of FIG. 2 are pockets 88 that are formed within the radial band 35 of the collar 34. An end of each of the levers 56 contacts the radial band 35 within the pockets 88. An opposing end of each lever 56 contacts the latching sleeve 59 within the space formed by the engaged portion 61 of the slot 58. The simultaneous contact by the opposing ends of the levers 56 within the pockets 88 and engaged portions 61 couples the collar 34 to the inner sleeve 46. So by rotating the hand wheel 26 about the axis $A_X$, the housing 24 and elevator nut 69 rotate with the actuator nut 28.

As indicated above, threads 32, 40 are same in direction with threads 30, 36. Thus, the rotational direction of the hand wheel 26 that downwardly urges the upper stem 40 also generates a reactive force that is directed upward against the actuator nut 28 and downward on the collar 34. By setting the pitch of the threads 32, 40 greater than the threads 30, 36, the upper stem 38 moves downward within the bore 42, but at an increment per revolution of the hand wheel 26 reduced by the pitch of the threads 30, 36. The differential thread pitch also results in a greater output force exerted onto the upper stem 38, with the same input torque provided at the hand wheel 26, than if the collar 34 were not included. For the purposes of discussion herein, this is referred to as a differential screw configuration. As noted above, when the valve 22 is in the closed position of FIG. 1, the actuation force for opening the valve is greater in the initial stages and reduces as the valve becomes opened.

Figure 3:
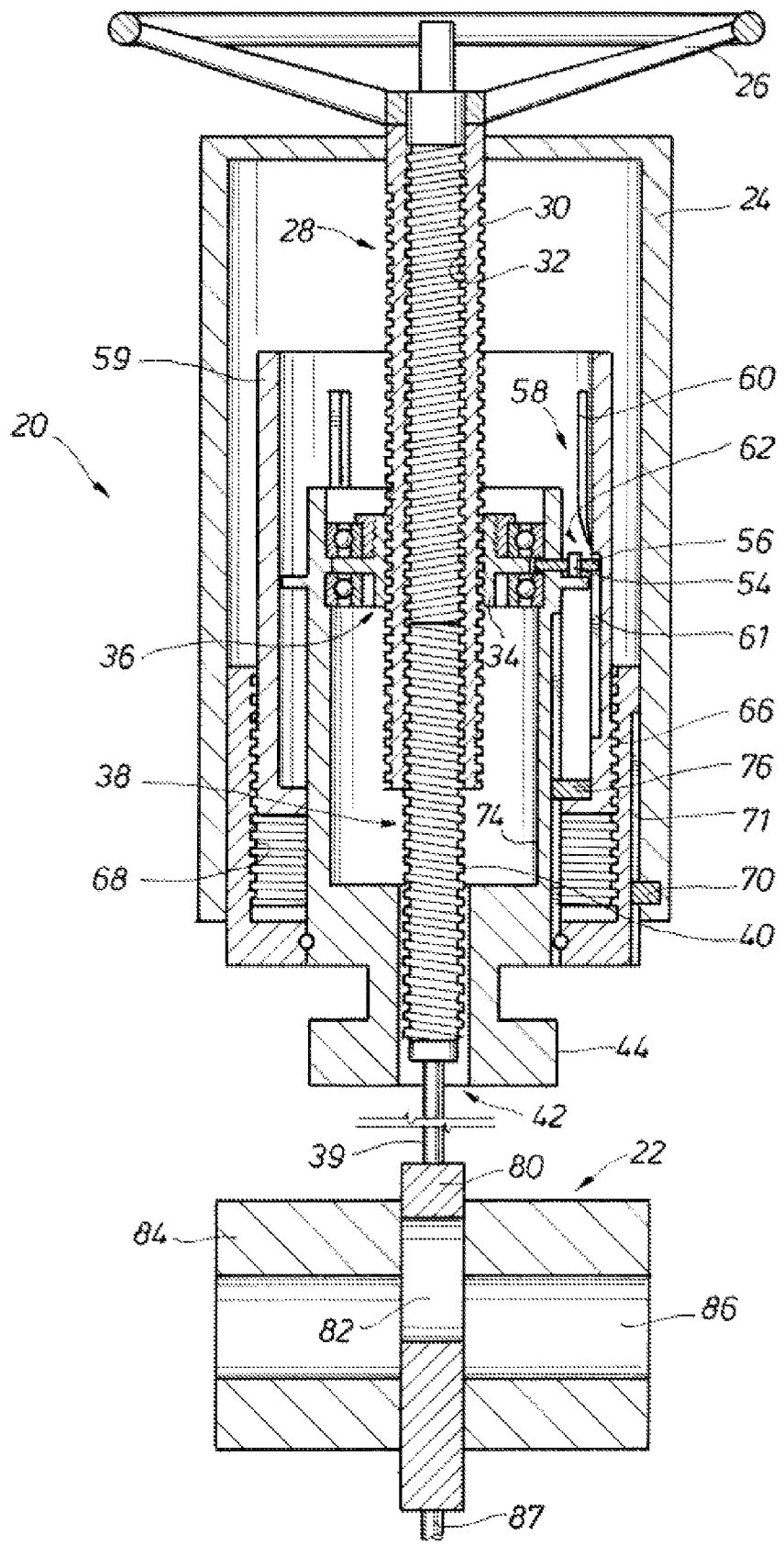
FIG. 3 is side sectional view of the valve actuator and valve of FIG. 1 with the valve in a partially open/closed position.

Referring now to FIG. 3, an example embodiment of the valve actuator assembly 20 is shown combined with the valve 22 wherein the upper stem 38 has moved downward within the bore 42 with respect to its position from FIG. 1. Correspondingly, the gate 80 is moved within the valve body 84 so the opening 82 within the gate 80 is partially registered with the passage 86. The force required for repositioning the gate 80 from its position in FIG. 1 to the partially opened position in FIG. 3 is greater than the force to fully open the valve 22. Thus to obtain a mechanical advantage for this stage of the actuation of the valve 22, the actuator assembly 20 is in a differential screw configuration. The device described herein provides an advantage of seamlessly converting from the differential screw configuration into a direct drive configuration. When changing between configurations, the lever 56 is within the transition slot 62 and beginning to disengage from the collar 34. So that additional rotation of the hand wheel 26 will not experience the differential pitch figuration of FIG. 1, but instead the collar 34 decouples from the latching sleeve 59 and no longer rotates with respect to the actuator nut 28, but instead rotates with the actuator nut 28. When in the direct drive configuration, the upper stem 38 is urged axially at an incremental distance with each rotation of the hand wheel 26 substantially equal to the pitch of the threads 32, 40.

Figure 4:
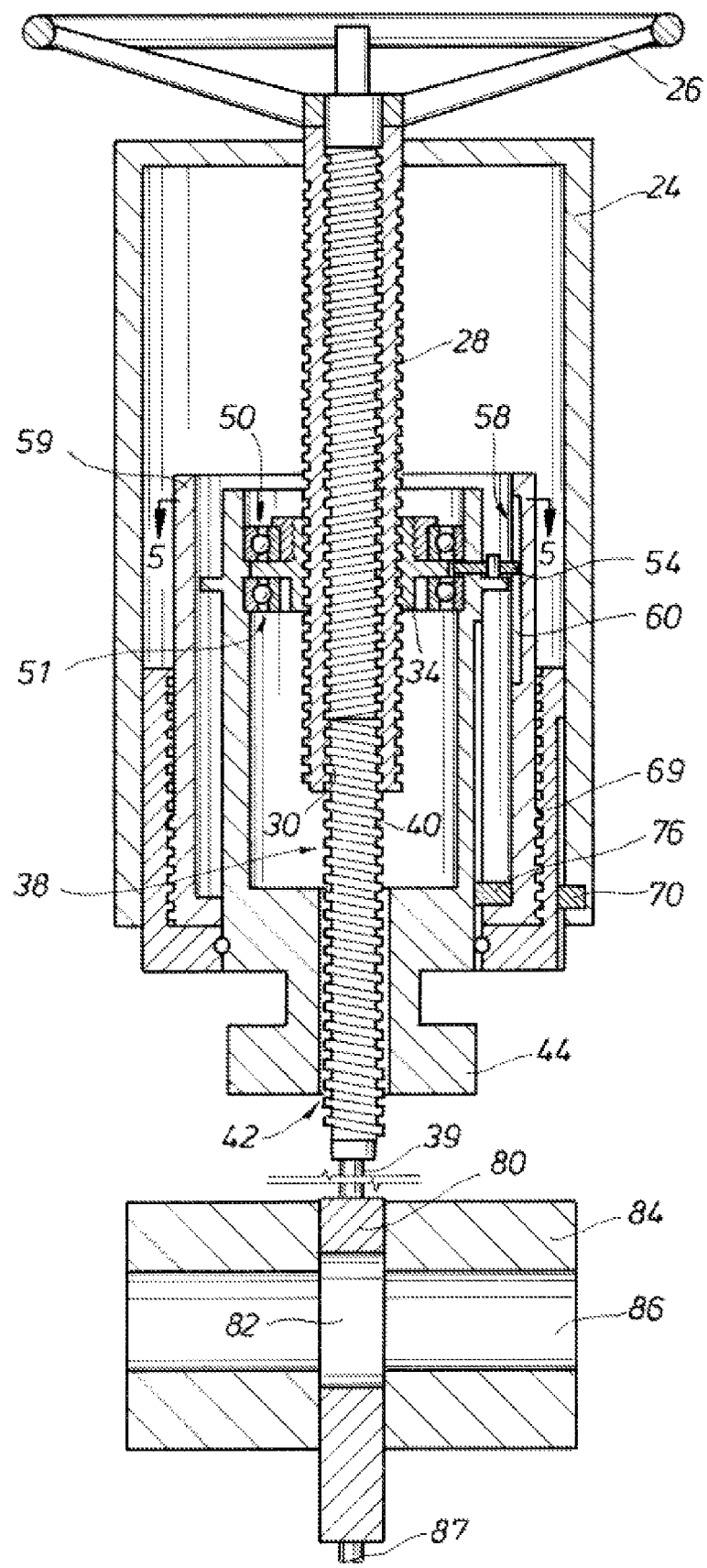
FIG. 4 is side sectional view of the valve actuator and valve of FIG. 1 with the valve in an open position.

As illustrated in the side sectional view of FIG. 4, further rotation of the hand wheel 26 can be used to downwardly drive the upper stem 38 and lower stem 39 until the gate 80 is moved within the valve body 84 to register the opening 82 with the passage 86. In this configuration, the valve 22 is in an open position so that fluid may flow through the valve body 84. In the embodiments of FIGS. 3 and 4, the housing 24 is shown having moved upwards relative to the elevator nut from the interaction between the actuator nut 28 and collar 34. The key 70 and slot 71 coupling between the housing 24 and elevator nut 69 allows the relative vertical motion between these two members. Further, it should be pointed out that the threaded connection between the latching sleeve 59 and elevator nut 69 reciprocate the latching sleeve 59 within the elevator nut 69; in a direction depending on the rotational direction of the hand wheel 26. Reciprocating the latching sleeve 59 in turn axially moves the slot 58 relative to the lever 56. When the slot 58 is moved so that the lever 56 engages the disengaged portion 60, the lever 56 pivots from its contact with the radial band 35 in the pocket 88 to decouple the collar 34 and latching sleeve 59. When the collar 34 and latching sleeve 59 are decoupled, the valve actuator assembly 20 is in the direct drive mode. Rotating the hand wheel 26 in a direction opposite from that to change the valve actuator assembly 20 from its configuration of FIG. 1 to its configuration of FIG. 4 can then turn the valve 20 to its closed position of FIG. 1.

In an embodiment, strategically positioning the component parts of the valve actuator assembly 20 create the differential screw configuration, and thus the mechanical advantage, to occur when the valve 22 is proximate its closed position. Another advantage of the device disclosed herein is that when the valve 22 is in positions that do not require an increased force for actuation, the valve actuation assembly 20 converts into the direct drive configuration of FIG. 4; When in direct drive, a greater incremental movement distance of the upper stem 38 is realized with each rotation of the hand wheel 26 over that of the differential screw configuration. The device described herein then increases the speed of opening or closing the valve 22 over that of an assembly that employs a differential pitch throughout the entire opening and closing sequence and reduces the number of turns to achieve the same travel distance.

Figure 5:
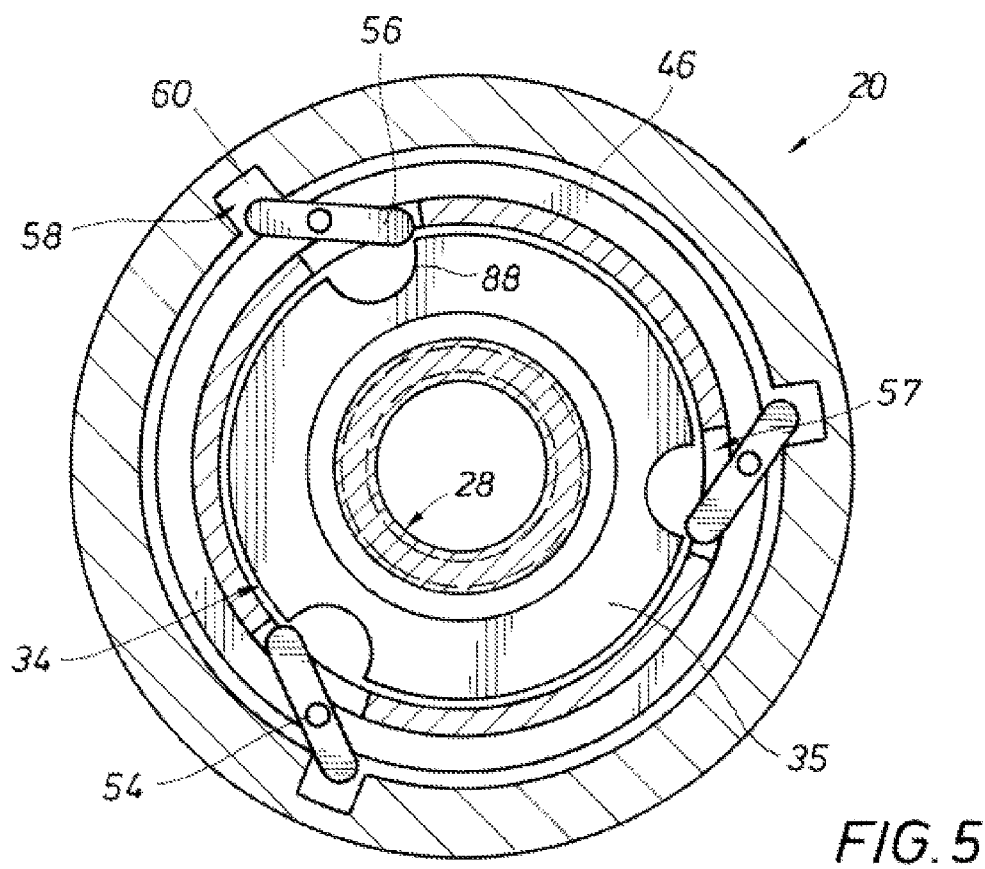
FIG. 5 is a sectional view of the valve actuator of FIG. 4 taken along lines 5-5.

FIG. 5 is a side sectional view of the embodiment of the valve actuator assembly 20 of FIG. 4 and taken along lines 5-5. In this embodiment, the latching sleeve 56 has moved downward with respect to the lever 56 so that the lever 56 has been moved from the engaged portion 61 to the disengaged portion 60. As previously noted, the disengaged and engaged portions 60, 61 are angularly offset from one another thereby pivoting the lever 56 in and out of contact with the pockets 88. Moving the levers 56 out of the pockets 88 thereby decouples the collar 34 from the inner sleeve 46 and allowing free rotation of the collar 34 with the actuator nut 28.

One example of use, the valve actuator 20 is coupled with a valve 22 where the valve can be exposed within a well control device such as a production tree or one controlling the flow of fluids used for fracturing within a wellbore. Referring back to FIG. 1, when the valve 22 is in the closed position and the opening 82 is unregistered with the passage 86, a pressure gradient exists across the gate 80 inducing a force to resist movement of the gate 80 within the valve body 84. The resistive forces at the beginning of the stroke that opens the valve 22 exceed those present at the end of the opening stroke. The strategic positioning of the components of the valve actuator assembly 20 form a differential screw configuration at the beginning of the opening stroke. The different pitch of threads 32, 40 and threads 30, 36, limit the axial movement of the gate 80 to the difference of these pitch values for each rotation of the hand wheel 26. However, this in turn produces a mechanical advantage that the hand wheel 26 can move the gate 80 with an applied force or torque less than that which would be necessary if the differential screw configuration was not in place. Continued rotation of the hand wheel over time axially moves the latching sleeve 59 downward to register the lever 56 and the transition portion 62 of the slot 58. Further movement moves the lever 56 into the disengaged portion 60 thereby decoupling the collar 34 and latching sleeve 59 so that direct drive between the hand wheel 26 and upper stem 38 is realized. Although the mechanical torque advantage is removed at this point, the resistant forces within the valve 22 are not present so that less torque on the hand wheel 26 is required to actuate the gate 80 within the valve 22. When in the reduced torque advantage configuration, the speed of movement of the gate 80 is increased over that of the differential configuration of FIG. 1. Thus, the assembly disclosed herein provides the double advantage of an increased torque output when needed, that automatically switches to a faster direct drive configuration when less torque is required.

While the invention has been shown or described in only some of its forms, it should be apparent to those skilled in the art that it is not so limited, but is susceptible to various changes without departing from the scope of the invention. For example, a motor could be mounted onto the actuator nut 28 for driving the valve actuator assembly 20.

What is claimed is:

1. A valve actuator comprising:
   an annular actuator nut having threads on an outer surface and threads on an inner surface that are oriented in a same direction to the threads on the outer surface and the threads on the inner surface having a greater pitch;
   a latching sleeve circumscribing a portion of the actuator nut and selectively moveable along an axis of the valve actuator;
   a linkage having an end attached to the actuator nut and threads that engage threads on an outer surface of the latching sleeve;
   a profile on an inner surface of the latching sleeve having an engaged portion and a disengaged portion;
   a lever slidable within the profile;
   a collar threaded to the outer surface of the actuator nut that is rotatable with respect to the actuator nut when the lever is in the engaged portion of the profile and rotates with the actuator nut when the lever is in the disengaged portion of the profile; and a valve stem threadingly engaged to the threads on the inner surface of the actuator nut.

2. The valve actuator of claim 1, wherein the linkage comprises an annular elevator nut having threads on an inner surface that engages the threads on the outer surface of the latching sleeve, a tubular housing telescopingly mounted over a portion of the elevator nut and end wall attached to the actuator nut.

3. The valve actuator of claim 2, further comprising a key attached to an inner surface of the housing that protrudes into an axial slot on an outer surface of the elevator nut, so that the elevator nut and housing are rotatingly coupled and axially slideable to one another.

4. The valve actuator of claim 1, wherein rotating the actuator nut urges the latching sleeve axially thereby axially moving the profile across the lever.

5. The valve actuator of claim 1, further comprising a ledge projecting radially outward from an outer surface of the collar, and pockets formed in the ledge for engaging the levers.

6. The valve actuator of claim 1, further comprising an inner sleeve in an annular space between the actuator nut and the latching sleeve, a lip projecting radially outward from an outer surface of the inner sleeve, and a pivot pin on the lip on which the lever is coupled.

7. The valve actuator of claim 1, wherein when the lever is in the engaged portion of the profile a torque input to the actuator nut generates a force on the valve stem at a force to torque ratio that is greater than a force to torque ratio when the lever is in the disengaged portion of the profile.

8. The valve actuator of claim 1, wherein when the lever is in the disengaged portion of the profile, each revolution of the actuator nut moves the valve stem an incremental distance at a revolution to displacement ratio that is greater than a revolution to displacement ratio when the lever is in the engaged portion of the profile.

9. The valve actuator of claim 1, further comprising a transition portion in the profile between the engaged and disengaged portions, so that as the latching sleeve axially moves with respect to the collar, the collar selectively changes between engaged and disengaged configurations.

10. A valve actuator comprising:
an input shaft;
a series of threaded connections that are selectively configurable as a differential screw and as a direct drive;
an input to the series of threaded connections that is coupled with the input shaft;
an output from the series of threaded connections that is coupled with a valve stem;
a selector switch for changing the configuration of the series of threaded connections between the differential screw and direct drive configurations; and
a sliding sleeve having a profile that engages the selector switch.

11. The valve actuator of claim 10, wherein the valve stem is connected to a valve that strokes between an open position and a closed position, and the profile is strategically dimensioned to manipulate the selector switch so that the series of threaded connections is configured as a differential screw during the beginning of the stroke of the valve having a higher resistance to movement.

* * * * *